United States Patent
Burkhardt

[11] Patent Number: 5,218,355
[45] Date of Patent: Jun. 8, 1993

[54] APPARATUS FOR PROJECTING ARTIFICIAL HORIZON VIEWABLE BY PERIPHERAL VISION

[76] Inventor: Donald P. Burkhardt, 4 Pewter Pla., Dix Hills, N.Y. 11746

[21] Appl. No.: 603,230

[22] Filed: Oct. 25, 1990

[51] Int. Cl.$^5$ .................................. G01C 21/00
[52] U.S. Cl. ........................ 340/974; 73/178 R; 340/980; 356/248
[58] Field of Search ............ 340/971, 973, 974, 975, 340/980, 705; 33/328, 329, 318; 350/6.6, 486, 6.1, 484; 356/248, 252, 251, 254; 73/178 R; 359/630, 632

[56] References Cited

U.S. PATENT DOCUMENTS

| | | | |
|---|---|---|---|
| 2,176,197 | 10/1939 | Bentley | 33/319 |
| 2,887,927 | 5/1959 | Newton | 340/971 |
| 2,941,306 | 6/1960 | Uecker | 33/329 |
| 2,943,482 | 7/1960 | Fritze et al. | 340/973 |
| 3,282,242 | 11/1966 | Wrestler, Jr. | 33/328 |
| 3,518,016 | 6/1970 | Burdin et al. | 356/248 |
| 4,083,239 | 4/1978 | Malcolm et al. | 340/980 |
| 4,397,555 | 8/1983 | Malcolm et al. | 340/980 |
| 4,743,903 | 5/1988 | Morley | 340/980 |
| 4,882,845 | 11/1989 | Boyer | 340/973 |
| 5,134,394 | 7/1992 | Beadle | 340/971 |

Primary Examiner—Jin F. Ng
Assistant Examiner—Brent A. Swarthout
Attorney, Agent, or Firm—Edward H. Loveman

[57] ABSTRACT

Apparatus for projecting an elongated light bar representing an artificial horizon on an interior surface of an aircraft cockpit in front of a pilot of the aircraft with respect to a reference datum line on the interior surface of the cockpit. A vertical reference means, located in the cockpit or remotely therefrom maintains a vertical reference axis for all attitudes of the aircraft. A light beam source, which may be a laser beam, is aligned with a movable optical system having mirrors or lenses to convert the light beam to a plane of light. A mechanical linkage or a servomotor coupled between the vertical reference means and the optical system controls the optical system, so that the datum line appears stationary and the light bar seems to turn angularly and move vertically when the aircraft rolls and pitches.

15 Claims, 4 Drawing Sheets

APPARATUS FOR PROJECTING ARTIFICIAL HORIZON VIEWABLE BY PERIPHERAL VISION

BACKGROUND OF THE INVENTION

1. Field of the Invention

This invention relates to artificial horizons of the type used to project a line of light in front of the pilot of an aircraft, and more particularly concerns projection apparatus of an artificial horizon having extended length and viewable by peripheral vision of a pilot to indicate roll and pitch of the aircraft.

2. Description of the Prior Art

Conventional aircraft instruments include a device which indicates the orientation of the aircraft relative to a horizon. The instrument is located in the cockpit where the pilot can inspect periodically the relatively small image representing a horizon to determine whether the aircraft is in a condition of roll with respect to its longitudinal axis, or pitch with respect to a lateral axis. This requires the pilot to use central vision which encompasses a solid angle of about 3 degrees directly in front of the pilot's eyes.

Central vision regards an instrument such as an artificial horizon as presenting a symbol which requires decoding and interpretation before any sense of spatial positioning can be obtained from it. Peripheral vision on the other hand, is used naturally for sensing motion in everyday situations, and is accomplished by means of dedicated "hardwired" circuits which recognize line-like features in the peripheral visual field, and convey details about their movements to the centers of the brain responsible for motion perception. Thus any instrument which provides information about movement of the pilot and aircraft by means of his peripheral vision will make use of these dedicated circuits, and frees the pilot's conscious thinking from the business of constantly interpreting symbols.

Since it is not practical to extend the size of the existing artificial horizon so that it can be viewed and perceived by the peripheral vision of the viewer, means must be devised to overlay the normal instrument panel with visible information which can be perceived at the periphery of the vision field. The most practical means known at present is to shine a line or bar of light from a projector onto a standard instrument panel, with means provided for causing the bar of light to seem to move relative to the aircraft to indicate the position of the aircraft with respect to the actual horizon.

One prior apparatus provides a line of light or a light bar in front of the pilot for observation by peripheral vision as disclosed in U.S. Pat. No. 4,083,239. A light source is mounted in a housing. One part of the housing is made to tilt and another part rotates thereby moving optical elements which transmit a light bar in front of the pilot. Movement of the parts is related to the aircraft's gyro platform so that the light oar gives a display representing the true horizon at shallow bank angles. Although this apparatus is acceptable in some applications, it is not practical in all aircraft primarily because the structure is quite bulky and will not fit readily into the cockpit of existing aircraft. In addition the apparatus does not project a true artificial horizon inasmuch as the pitch axis rolls as the aircraft rolls, that is, the pitch axis is not free floating within the roll gimbal and therefore the projector cannot display pitch information when the aircraft is rolled 90°. Other systems which have been proposed for generating an artificial horizon viewable by peripheral vision are described in U.S. Pat. Nos. 4,397,555 and 4,616,226. These systems have the disadvantage that they are quite complicated in structure circuitry and adjustment, and are expensive to manufacture.

SUMMARY OF THE INVENTION

The present invention is directed at providing a compact, relatively simple and inexpensive apparatus for projecting an artificial horizon viewable by peripheral vision. The present apparatus avoids the difficulties and disadvantages encountered with prior artificial horizon generating systems such as has been referred to above.

In one embodiment of the invention there is provided a source of an intense light beam such as a laser beam generator. The laser beam generator is mounted in the cockpit of the aircraft and projects a concentrated light beam forwardly upon a first angularly disposed mirror which reflects the beam upwardly to a second angularly disposed mirror which reflects the beam rearwardly to a curved third mirror. The curved mirror spreads the beam into a plane of light and reflects it forwardly to impinge upon the instrument panel to define a straight line or bar of light of extended length which can be viewed by peripheral vision of the aircraft pilot. When the second mirror is optically aligned with the curved mirror and with the roll axis of the aircraft and the roll axis is level, a gap is produced in the straight line of light, regardless of the extent of roll as long as the pitch of the aircraft remains level. When the aircraft turns on its lateral pitch axis the light line or bar moves up or down with respect to a datum line on the instrument panel and the gap disappears from the light bar. The curved mirror is carried by a shaft engaged at opposite ends in gimbals carried by spaced lateral arms of a yoke supporting a gyroscope on a lateral shaft connected to the yoke by gimbals. The gyroscope rotates axially on a vertical shaft connected to the yoke by gimbals. The gyroscope rotates axially on a vertical shaft which always remains perpendicular to the earth's surface and defines a reference axis. A mechanical linkage is provided between the curved mirror and the gyroscope to keep the axis of generation of the curved mirror angularly proportional or substantially parallel to the reference axis of the gyroscope, so that the mirror projects a plane of light forwardly which appears horizontal. The projected image of a straight light bar constitutes an artificial horizon which seems to turn angularly with respect to a datum line on the instrument panel when the aircraft rolls and which seems to move up or down with respect to the datum line when the aircrafts turns on its lateral pitch axis. Actually it is the projected light bar or simulated artificial horizon which remains horizontal, while the datum line turns and moves up or down as the aircraft rolls and pitches. However to the pilot viewing the artificial horizon it seems as if the artificial horizon is moving with respect to the fixed datum line.

In this particular embodiment, the optical path from the light beam generator to the curved mirror includes three mirrors. In another embodiment only two mirrors are used. The laser beam generator is disposed in an axially vertically position above an angularly tilted first mirror. The tilted mirror reflects the laser beam horizontally and rearwardly to a curved second mirror carried by the yoke of the gyroscope. In this embodiment, the curved second mirror projects a substantially horizontal plane of light forwardly to define the light bar representing the artificial horizon.

In a third embodiment the mirrors are omitted. The laser beam generator is carried by gimbals on the yoke of the gyroscope. Axially aligned with the laser beam generator is a collimating lens, and a wedge shaped lens which spreads the beam into a plane of light. The plane of light impinges on the instrument panel to define the light bar which is the artificial horizon. A linkage between the gyroscope and beam generator or lenses keeps the plane of light substantially horizontal and angularly proportional to the vertical axis of rotation and reference axis of the gyroscope.

In a further embodiment, the gyroscope is remotely located and sends data signals representing its position to servomotors having shafts driving the curved mirror or projecting lens. The servomotors control turning of the mirror or lens to keep the projected image horizontal and perpendicular to the vertical axis of rotation of the remote gyroscope, so that the light bar projected on the instrument appears to be an artificial horizon analogous to the true horizon.

All embodiments of the invention are characterized by relative simplicity of construction, ease of adjustment, and reliability in operation.

These and other objects and many of the attendant advantages of this invention will be readily appreciated as the same becomes better understood by reference to the following detailed description when considered in connection with the accompanying drawings in which:

DESCRIPTION OF THE PREFERRED EMBODIMENTS

Figure 1:
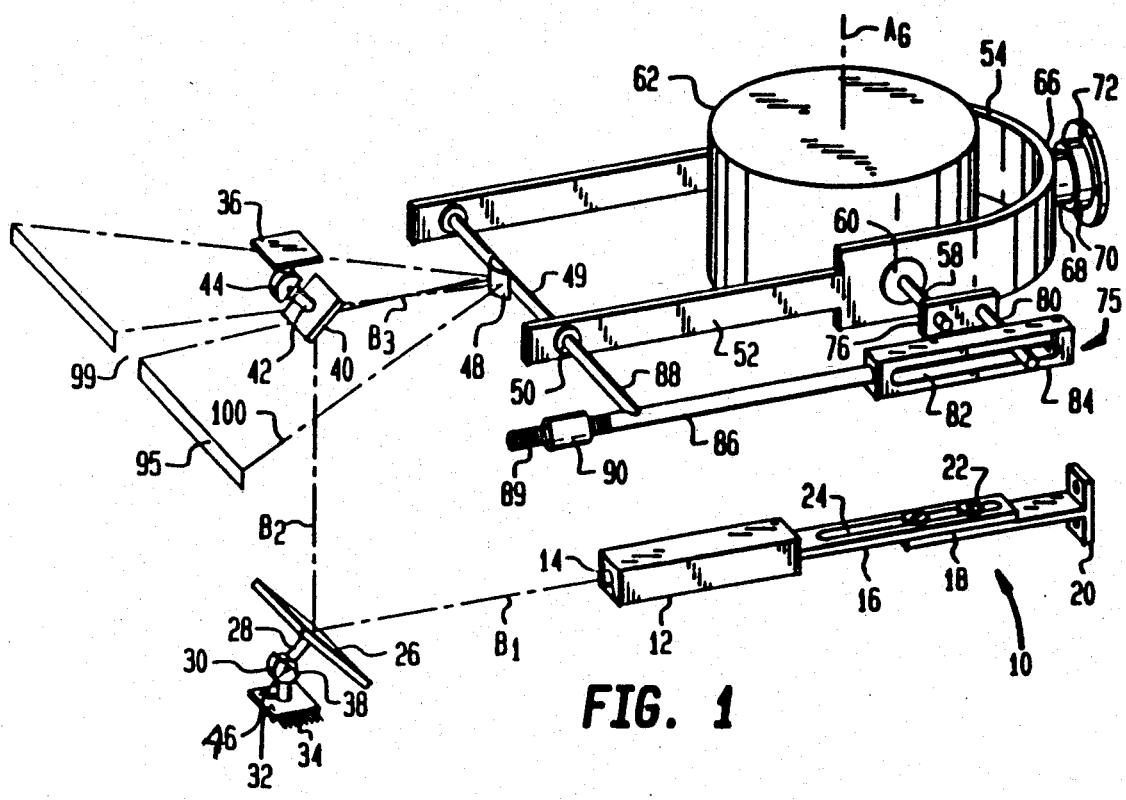
FIG. 1 is an oblique perspective view of parts of a first apparatus for projecting an artificial horizon, according to the invention.
Figure 2:
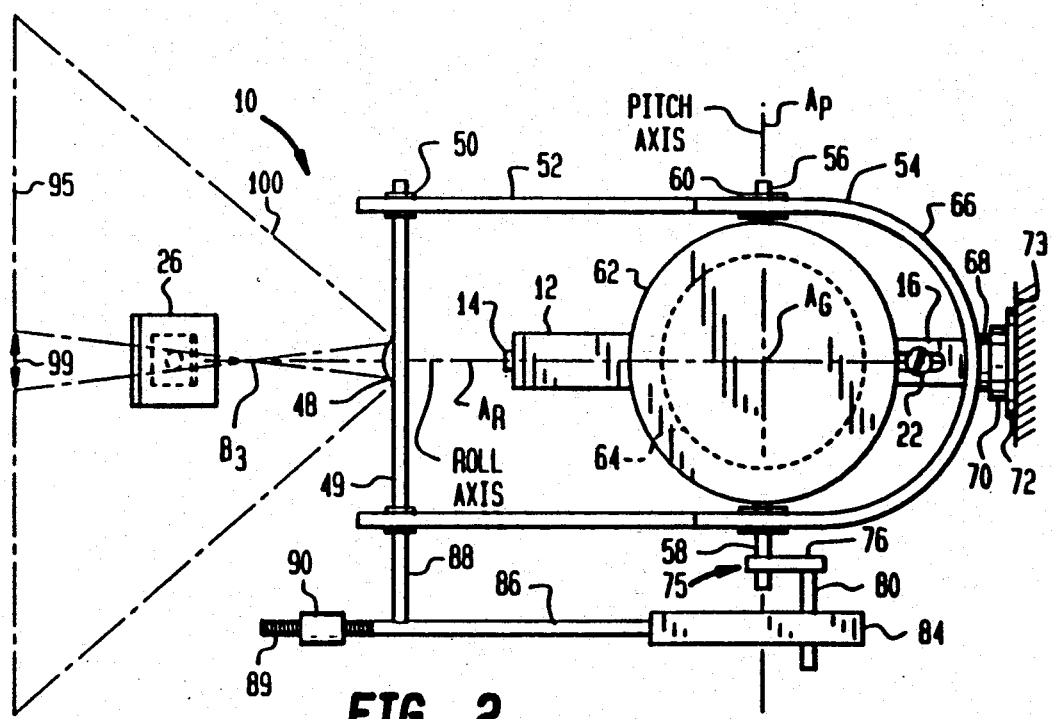
FIG. 2 is a top plan view of the apparatus of FIG. 1.
Figure 3:
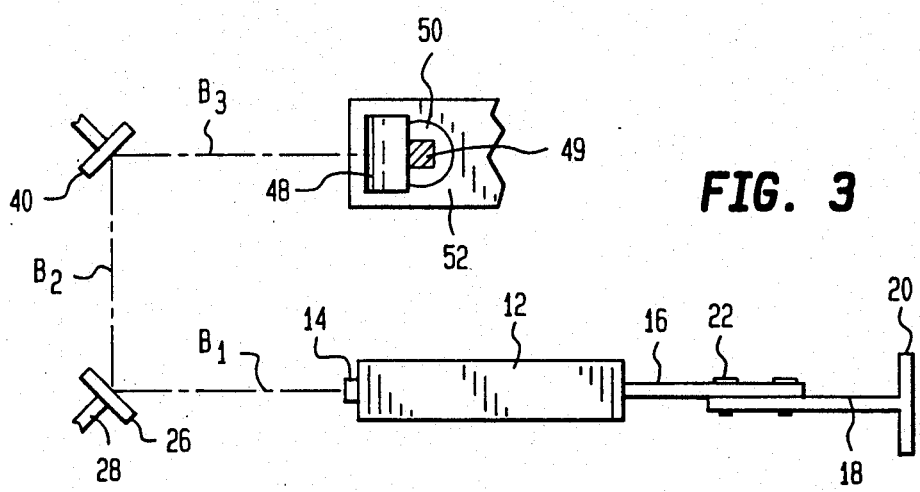
FIG. 3 is a side view partially diagrammatic in form of parts of the optical system employed in the apparatus of FIGS. 1 and 2.

Referring now to the drawings wherein like reference characters designate like or corresponding parts throughout, there is illustrated in FIGS. 1, 2 and 3 a first apparatus designated generally by reference numeral 10. The apparatus includes a capsule 12 containing a laser light beam generator. Attached to the capsule 12 is a bracket assembly which has longitudinally adjustable flat plates 16,18 terminating in a bracket 20 which can be secured to a support such as a back wall of a cockpit in an aircraft. Screws 22 extending through a slot 24 in the bar 16 enable the capsule 12 to be adjusted longitudinally and locked in place by tightening the screws 22 which are inserted in holes in the bar 18. An intense laser light beam B1 is emitted from the forward end 14 of the capsule 12. This horizontal beam B1 impinges on a first plane mirror 26 tilted at an angle to reflect a beam B2 upwardly. The mirror 26 is carried by arm 28 of a universal ball joint 30. The joint 30 is carried by a bracket 32 which can be secured to a stationary horizontal support 34. The joint can be locked in place by a screw 36 inserted in a stationary shell 38 of the joint 30. The beam B2 impinges on a second mirror 40 tilted at an angle and held in place by a bracket 42 having a universal ball joint 44. The bracket 42 can be secured to an upper stationary horizontal support 46 such as the ceiling of the cockpit in which the apparatus 10 is installed. A horizontal beam B3 is reflected rearwardly and impinges on an axially vertical convex third mirror 48 which is secured to a horizontal shaft 49 journaled in bearings 50, which are respectively mounted in laterally spaced arms or extensions 52 of a U-shaped gimbal 54. Rearwardly of the shaft 49 and the mirror 48 are axially aligned lateral stub shafts 56,58 journaled in bearing 60 on respective arms 52 of the gimbal 54. The stub shafts 56, 58 carry an axially vertical cylindrical housing 62 for a rotating axially vertical gyroscope 64. The rotational axis Ag of the gyroscope always maintains itself axially perpendicular to a plane tangential to the curved earth's surface wherever the aircraft carrying the gyroscope travels. Axis Ag is the vertical rotational axis of the reference of the gyroscope. The curved bight 66 at the rear of the gimbal 54 has an axially extending stub shaft 68 journaled in a cylindrical bearing 70 attachable by a flange 72 to a vertical support such as the rear wall 73 of the cockpit of the aircraft. The aircraft is capable of rolling or banking on its longitudinal axis which is designated the roll axis Ar. The center of the mirror 40 is also aligned with the roll axis Ar. In order to provide the proper pitch information at the artificial horizon display, a linkage assembly 75 is provided to maintain the curved mirror 48 angularly proportionate to the reference axis Ag of gyroscope 64. The linkage assembly 75 mechanically links the curved 48 mirror with the gyroscope rotor. The linkage assembly 75 has a crank arm 76 secured to an extension of the stub shaft 58 near the forward end of the arm 76. Near the rear end of the arm 76 is a crank pin or shaft 80 perpendicular to the arm 76. The crank pin 80 extends slidably and rotatably through a slot 82 in a link bar 84. The link bar 84 carries a horizontal shaft 86 at its forward end. The shaft 86 is secured to an extension 88 of the shaft 49. A forward free end 89 of the shaft 86 is threaded and carries a rotatable cylindrical axially threaded weight 90. By turning the weight 90 the link bar 84, and the shaft 86 may be balanced along the axis defined by the shaft 88. The horizontal pitch axis Ap taken axially through the shafts 56, 58 is perpendicular to the roll axis Ar.

Figure 4:
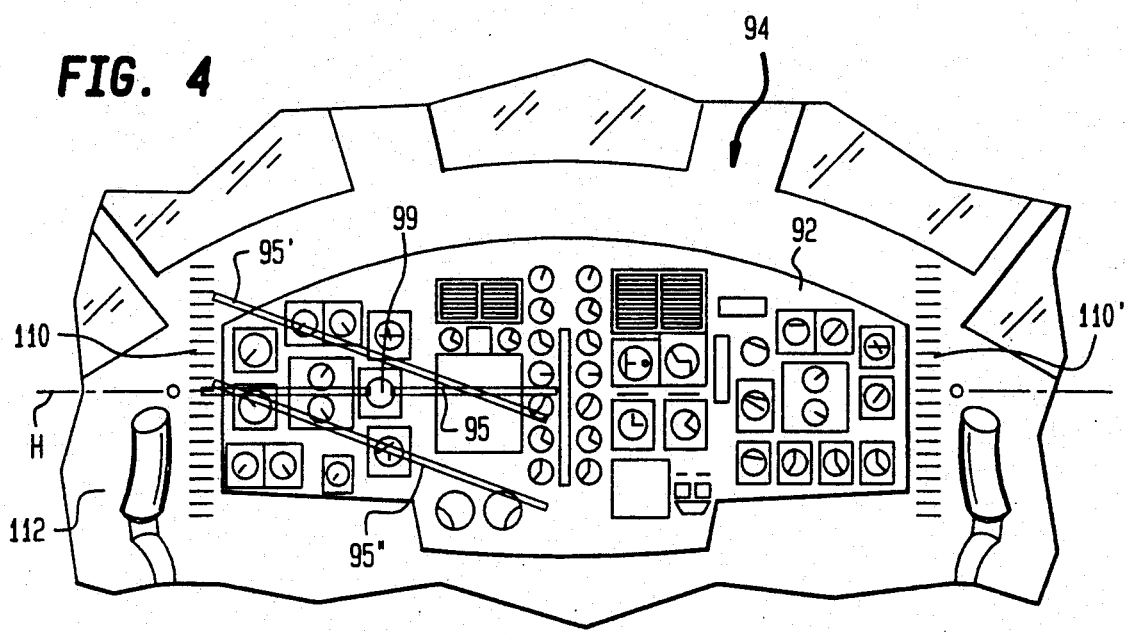
FIG. 4 is a front elevational view of an instrument panel in the cockpit of an aircraft equipped with the horizon projection apparatus of the present invention.

In operation of the apparatus 10, with the mirror 40 aligned along the axis Ar of the gyroscope, the mirror 48 receives a beam of light and projects a plane of light 100 to define an artificial horizon 95 which impinges on the instrument panel 92 in the cockpit 94 of the aircraft; see FIG. 4. When the aircraft is level longitudinally and transversely, the light bar 95 will coincide with the datum or horizon reference level H. A gap 99 will be present in the light bar 95 which is caused by the presence of the mirror 40 blocking the center portion of the horizontal plane of the light 100 reflected by the mirror 48. This level position PL of the bar 95 with the center gap 99 is clearly shown in FIG. 5A. The level position PL corresponds to a roll angle of 0° R and a pitch angle of 0° P.

Suppose that the aircraft moves around the pitch axis Ap, (as measured radially from the center of the aircraft symbol and perpendicularly to the light bar 95 illustrated in FIG. 5) the light bar 95 will rise or lower on the instrument panel. If the body of the aircraft behind the cockpit 94 rises while the nose end lowers through a pitch angle of for example 10° (a pitch down position), the light bar 95' will appear to move above the datum line H as shown in FIG. 5B The roll angle remains at 0° R while the pitch angle changes in a negative direction to become −10° P. The gap 99 disappears because the center of the mirror 48 is no longer blocked by the mirror 40. The pilot is at once made aware that the aircraft has pitched in a negative direction by disappearance of the gap 99 and by the space +s between the light bar 95' and the datum level H. If the aircraft pitches up in an opposite direction on the pitch axis Ap, the light bar 95" shown in FIG. 5C will appear a distance −s below the datum reference level H. Here again the absence of the gap 99 indicates that the pitch of the aircraft has changed from the 0° P level. Since the roll angle has not changed, the roll and pitch angles of the aircraft are now °0 R and +10° P.

Figure 5B:
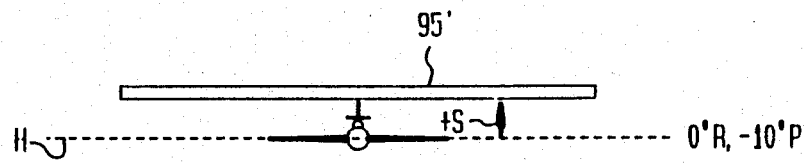
FIG. 5A, 5B, 5C, 5D, 5E, 5F and 5G are diagrams showing various positions of an artificial horizon projected in an aircraft.
Figure 5A:
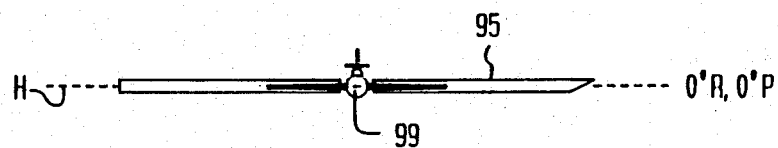
Figure 5C:
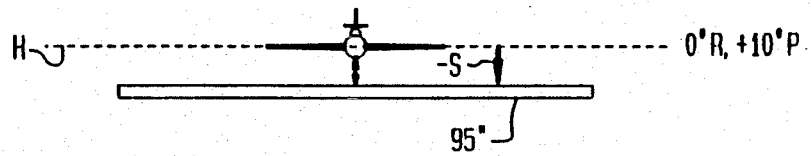
Figure 5D:
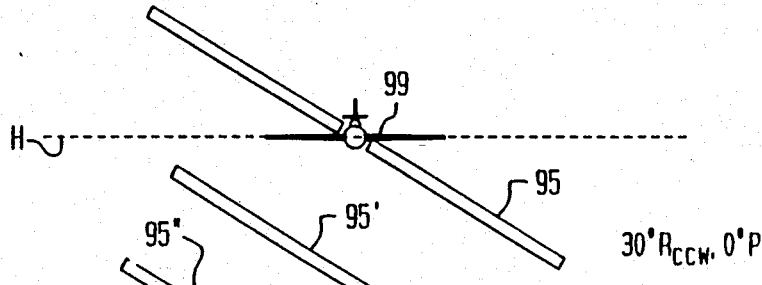
Figure 5E:
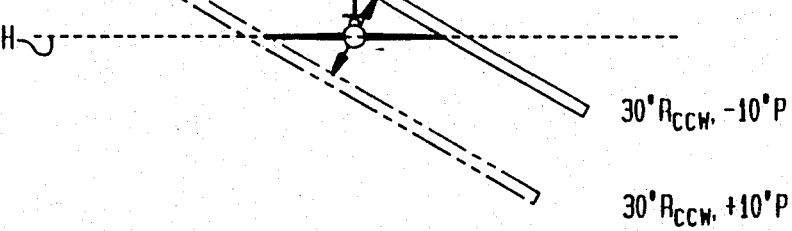
Figure 5F:
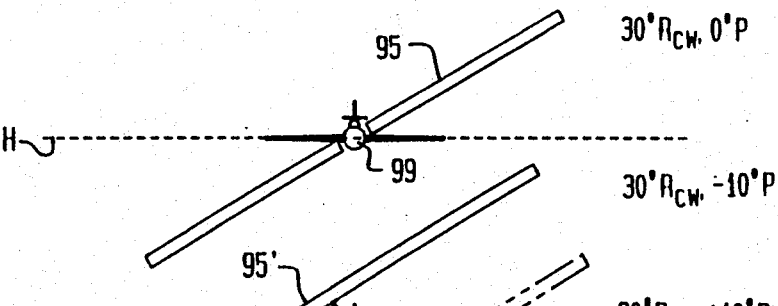

If the aircraft should roll or bank on the roll axis Ar without moving on the pitch axis Ap, the light bar 95 will reappear as shown in FIG. 5F with the central gap 99 to indicate the pitch angle is 0° P. If the aircraft rolls clockwise viewed from rear to front through an angle of 30° for example, the bar 95 will appear to be lowered below the datum H at the left end and raised above the datum H at the right end. The roll angle will be clockwise (CW) at 30° Rcw, and the pitch angle will be 0° P.

Figure 5G:
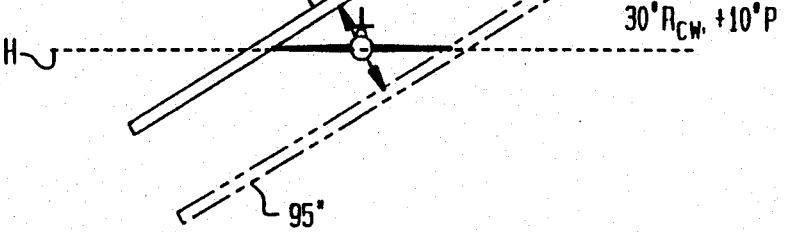

If the aircraft maintains the 30° clockwise roll angle and the pitch changes by −10° light bar 95' will rise wholly or partially above the datum level H as shown in FIG. 5G, for example and the gap 99 will disappear. The light bar 95' will have the same angular tilt as the bar 95 in FIG. 5F but will be largely above the datum level H to indicate a negative pitch. The roll and pitch angles respectively will be for example, 30° Rcw and −10° P as indicated in FIG. 5G. If the aircraft should change its pitch angle up in opposite direction, the light bar 95" will appear as indicated in FIG. 5G in dotted lines. Now the light bar is largely below the datum level H. The angle of roll remains the same as before so that the roll and pitch angles are respectively 30° cw and +10° P.

FIG. 5D shows a situation similar to that of FIG. 5F. Here the aircraft pitch angle is at °0P, the aircraft has turned, tilted or banked counterclockwise (CCW) on the roll axis Ar. Since the pitch is at 0° P the gap 99 reappears in the light bar 95. The right end of the light bar is now below the datum level H and the left end is above the level H, with the gap 99 at the center of the light bar 95. The roll and pitch angles are respectively 30° Rccw and 0° P. In FIG. 5E the light bar 95' is shown in solid lines largely above the datum level H, and the aircraft is pitched downwardly. The roll angle remains the same as in FIG. 5D but the aircraft has assumed a negative pitch angle. These angles are indicated respectively as 30° Rccw, and −10° P. FIG. 5E shows in dotted lines the light bar 95''', which is largely below the datum line H, and the aircraft is pitched upwardly or positively while the roll angle remains the same. The roll and pitch angles are now respectively 30° Rccw and +10° P.

In FIG. 4 the light bars 95" and 95" are shown above and below the datum level H, for negative and positive pitches of the aircraft respectively. The gap 99 only appears in light bar 95 which is at a pitch angle of 0° P. If desired, a scale 110 can be marked on the aircraft wall 112 adjacent the instrument panel. The scale 110 can be calibrated for various positive and negative pitches at 0° roll or clockwise and counterclockwise roll angles at 0° pitch. A similar scale 110' can be provided on the wall 112 at the copilot's position. The copilot's may be provided with a beam projecting apparatus 10 identical to that described above for the pilot's position.

Figure 6:
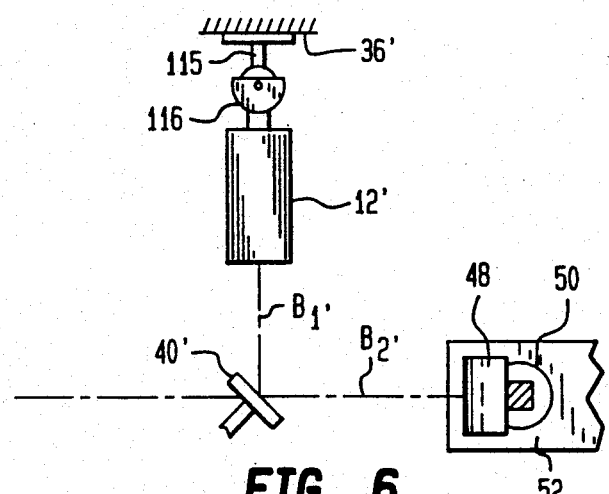
FIG. 6 is a side view of parts of an optical system of a second artificial horizon projection apparatus according to the invention.

In FIG. 6 is shown an alternate optical system which can be used in the apparatus 10. Here a laser beam generating capsule 12' is disposed in an axially vertical position and is attached by a bracked 115 to a ceiling 36' of the cockpit of the aircraft. A lockable universal ball joint 116 between the upper end of the capsule 12' and the bracket 115 enables adjustment and proper alignment of the laser beam B1'. Below the laser capsule 12' is a tilted mirror 40' which is the same as the mirror 40 but is tilted upwardly rather than downwardly. The beam B2 is directed horizontally to the curved mirror 48 which is the same as shown in FIGS. 1, 2 and 3 and is carried by the gimbal arms 52. The optical system of FIG. 6 employs only two mirrors and is simpler than the array of three mirrors shown in FIGS. 1, 2 and 3. This makes the apparatus 10 more compact and easier to install and adjust. Since the mirror 40' blocks the optical path from the mirror 48 when the roll axis Ar is level the gap 99 will appear in line 95 as shown in FIG. 5A.

Figure 7:
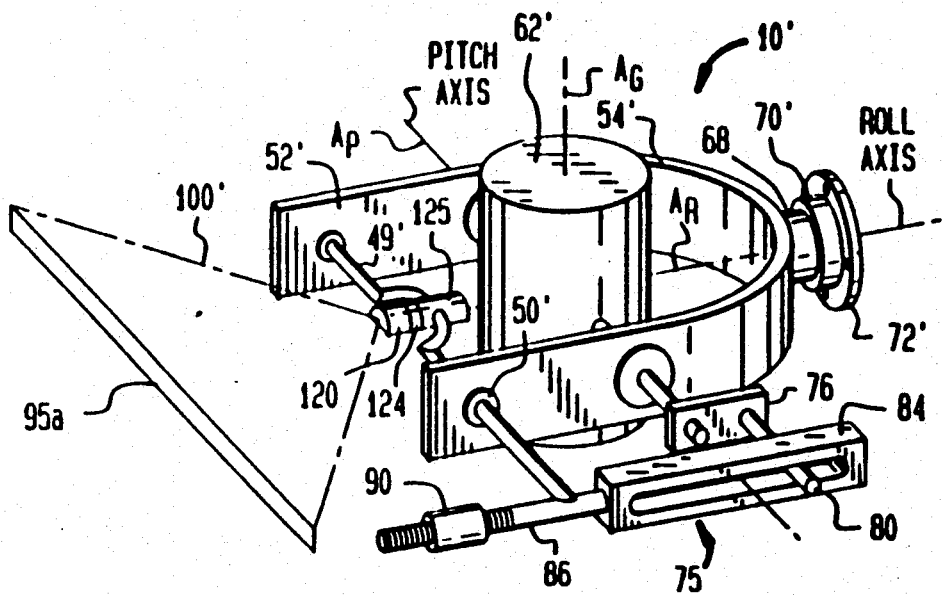
FIG. 7 is an oblique perspective view of parts of a third apparatus for projecting an artificial horizon.

FIG. 7 shows another optical system for use with apparatus 10', where parts identical to those of apparatus 10 are identically numbered. Instead of the three mirrors of apparatus 10 there is provided a cylinder lens 120. Behind the lens 120 and axially aligned with it is a collimating lens 124 disposed in front of a laser beam generating capsule 125 such as a laser diode. The laser capsule 125 extends axially horizontal and is aligned with the longitudinal roll axis Ar of the aircraft. The gyroscope housing 62' is carried by a transverse shaft which is axially aligned with the transverse pitch axis Ap of the aircraft. The capsule 125 is carried by a transverse shaft 49' journaled in bearings 50' on arms 52' of a gimbal 54'. The axial stub shaft 68 extends rearwardly from the gimbal 54' and is journaled in a cylindrical bearing 70' provided with a flange 72' for securing the bearing to the rear wall or other stationary support in the cockpit of the aircraft. The linkage members 76, 80, 84, 86 and 90 of the linkage 75 are the same as shown in FIGS. 1 and 2 for apparatus 10, and serve to keep lens 120 oriented so as to project the desired artificial horizon.

In operation apparatus 10" operates like apparatus 10 except there will be no center gap in the horizontal light bar 95a generated when the flaring light plane 100' emitted by lens 120 impinges on the instrument panel while the pitch axis is level, in a manner similar to that shown in FIG. 4. All of the various positive, negative and zero pitch angles illustrated in FIGS. 5A-5G can be obtained by apparatus 10' as the light bar moves up or down with respect to the datum line or level H. Similarly all the clockwise, counterclockwise and zero roll angles illustrated in FIGS. 5A-5G are obtained with apparatus 10'. Apparatus 10' has an advantage over the multiple mirror arrangements of FIGS. 1-3 and 6, since no mirrors are used. Instead the lens 124 and 120 spread the light in plane 100'. This effects a considerable simplification of the optical system and results in a very compact apparatus.

Figure 8:
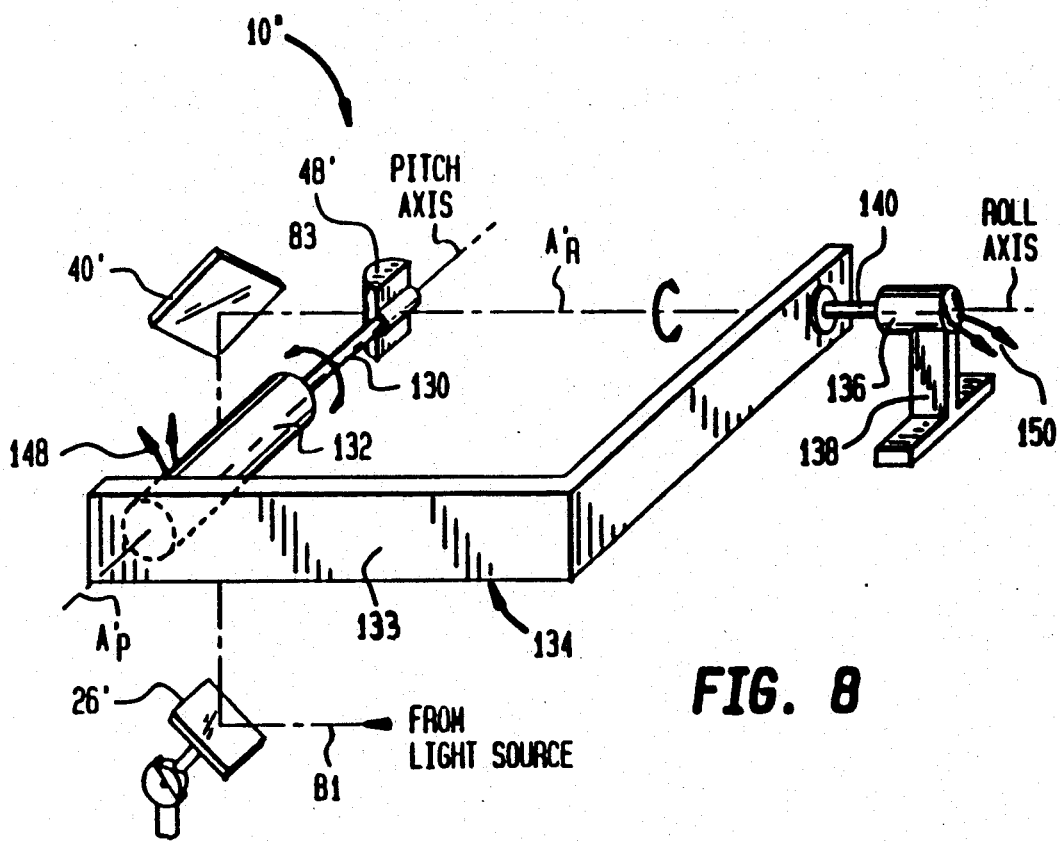
FIG. 8 is an oblique perspective view of a curved mirror such as employed in the systems of FIGS. 1, 6 and 7, provided with servomotors for stabilizing the orientation of the mirror and projected artificial horizon.

Instead of linking the mirror 48 or lens 120 mechanically to a local gyroscope 62 or 62', it is possible to employ a remotely located gyroscope. One such arrangement is shown partially in FIG. 8. Here apparatus 10" has a curved mirror 48' carried by a transversely disposed shaft 130 of a servomotor 132 which is secured to an arm 132 of an L-shaped bracket 134. The transverse pitch axis A'p is in registration with the axis of the shaft 130. Another servomotor 136 is secured to another stationary bracket 138. A shaft 140 of the servomotor 136 is secured to the bracket arm 134 and can turn the bracket 134 on the roll axis A'r of the aircraft which extends through the center of the mirror 48'. This apparatus can employ three mirrors 26', 40' and 48' in a manner similar to that shown in FIGS. 1, 2 and 3 for generating beams B1, B2 and B3 which produce light bars 95, 95' and 95" projected upon the instrument panel 20 of the aircraft. The mirror 48' is coordinated with the remote gyroscope by electrical signals generated at the gyroscope and conveyed to the servomotors 132 and 136 via respective wires 148, 150. By these means the axis of generation of the mirror 48' can be maintained angularly proportionate or substantially parallel to the axis of rotation of the remote gyroscope while the bracket 134 turns on the roll axis A'r. A similar arrangement of servomotors can be provided in apparatus 10' of FIG. 7 to replace the gyroscope 62'.

If desired the optical systems described can be modified to locate the light bar center wherever desired, i.e. on a windshield. A variable density light filter or a beam splitter means can be provided to adjust the brightness of the light bar display. If desired the laser light beam may be spread to a larger diameter and then collimated or refocused to allow for use of a larger mirror or lens for generating a longer light bar.

It should be understood that the foregoing relates only a limited number of preferred embodiments of the invention which have been by way of example only, and that is intended to cover all changes and modifications of the examples of the invention herein chosen for the purposes of the disclosure, which do not constitute departures from the spirit and scope of the invention.

What is claimed is:

1. Apparatus for projecting an elongated light bar representing an artificial horizon upon an interior surface of an aircraft cockpit in front of a pilot for viewing by the peripheral vision of said pilot, of a roll and pitch light image of said aircraft with respect to a center of a reference datum line on said interior surface in said aircraft cockpit, comprising:

first means in said aircraft for maintaining a vertical reference axis which remains perpendicular to the earth's curvature regardless of the amount of angular pitch and roll of said aircraft wherever said aircraft may travel, said first means providing a pitch output indictive of the pitch of said aircraft and a roll output indicative of the roll of said aircraft;

a second means fixed to said aircraft and coupled to said roll output of said first means;

light generating means for producing a light beam in said cockpit;

a movable optical means arranged to convert said light beam to a plane of light projected on said surface in front of said pilot, to cast on said surface an elongated light image viewable by the peripheral vision of said pilot, said movable optical means coupled to said second means; and mechanical means connecting said movable optical means to the pitch output of said first means for controlling movement of said movable optical means, corresponding to the pitch of said aircraft, so that said light image always remains substantially perpendicular to said vertical axis regardless of the amount of said angular roll of said aircraft, whereby said datum line appears to remain stationary, while said elongated light image appears to turn angularly with respect to said datum line on said surface as said aircraft rolls and to move perpendicularly to said roll light image as said aircraft pitches.

2. Apparatus as claimed in claim 1 in wherein said first means comprises a vertical gyroscope means axially rotating on said reference axis.

3. Apparatus as claimed in claim 2 wherein said movable optical means is comprised of at least one mirror optically aligned with said light generating means.

4. Apparatus as claimed in claim 3, wherein said mechanical means comprises a mechanical linkage between said mirror and said vertical gyroscope means.

5. Apparatus as claimed in claim 1, wherein said first means comprises a vertical gyroscope means axially rotating on said reference axis and located in said aircraft; and wherein said second means comprises a servomotor means electrically coupled to said vertical gyroscope means and mechanically linked to said movable optical means.

6. Apparatus as claimed in claim 5, wherein said movable optical means is comprised of at least one mirror which is optically aligned with said light generating means.

7. Apparatus as claimed in claim 2, wherein said movable optical means further comprises at least one lens optically aligned with said light generating means to spread said light beam horizontally to define said plane of light.

8. Apparatus as claimed in claim 7, wherein said second means comprises a mechanical linkage between said lens and said vertical gyroscope means.

9. Apparatus as claimed in claim 7, wherein said vertical gyroscope means is located in said aircraft; and wherein said second means comprises a servomotor means electrically coupled to said vertical gyroscope means and mechanically coupled to said lens.

10. Apparatus as claimed in claim 7, wherein said light generating means is mechanically coupled to said lens.

11. Apparatus as claimed in claim 10, wherein said second means comprises a mechanical linkage between said lens, said light generating means and said vertical gyroscope means so that said light image will indicate pitch.

12. Apparatus as claimed in claim 1, wherein said light generating means comprises a laser device capable of generating an intense beam of light.

13. Apparatus as claimed in claim 1, wherein said movable optical means comprises two mirrors located in optical alignment with each other.

14. Apparatus as claimed in claim 1, wherein said aircraft has a longitudinal axis and a roll axis which is parallel to said longitudinal axis, whereby a gap appears in said light bar when said pitch light image of said aircraft is at said center of said reference datum line, regardless of the angle of roll of said aircraft.

15. Apparatus as claimed in claim 14, wherein said aircraft pitches on a traverse axis, whereby said gap disappears from said light bar when said aircraft moves angularly in pitch.

* * * * *